US012739844B2

(12) United States Patent
Takeda et al.

(10) Patent No.: US 12,739,844 B2
(45) Date of Patent: Sep. 15, 2026

(54) DOWNLINK CONTROL INFORMATION WITH BANDWIDTH PART INDICATOR FOR MULTI-CELL SCHEDULING

(71) Applicant: QUALCOMM Incorporated, San Diego, CA (US)

(72) Inventors: Kazuki Takeda, Minato-ku (JP); Changhwan Park, San Diego, CA (US); Mostafa Khoshnevisan, San Diego, CA (US); Peter Gaal, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 18/168,953

(22) Filed: Feb. 14, 2023

(65) Prior Publication Data

US 2024/0276505 A1 Aug. 15, 2024

(51) Int. Cl.

*H04W 72/23* (2023.01)
*H04W 72/044* (2023.01)
*H04W 72/1263* (2023.01)

(52) U.S. Cl.

CPC ......... *H04W 72/23* (2023.01); *H04W 72/044* (2013.01); *H04W 72/1263* (2013.01)

(58) Field of Classification Search

None

See application file for complete search history.

(56) References Cited

U.S. PATENT DOCUMENTS 11,368,949 B2 * 6/2022 Gao .................. H04W 72/0453
11,523,381 B2 12/2022 Cirik et al.
2021/0274477 A1 9/2021 Yi et al.

FOREIGN PATENT DOCUMENTS

EP 4068896 A1 10/2022
WO 2019160353 A1 8/2019

OTHER PUBLICATIONS

International Search Report and Written Opinion—PCT/US2024/010831—ISA/EPO—Mar. 19, 2024.

* cited by examiner

*Primary Examiner* — Willie J Daniel, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) with a bandwidth part (BWP) indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The UE may communicate on the set of BWPs of the set of scheduled cells based at least in part on the mapping of the value to the set of BWPs. Numerous other aspects are described.

30 Claims, 16 Drawing Sheets

450

| BWP indicator field | Value |
| --- | --- |
| 00 | BWP #0 |
| 01 | BWP with BWP-ID = 1 |
| 10 | BWP with BWP-ID = 2 |
| 11 | |

455

| BWP indicator field | Value |
| --- | --- |
| 00 | BWP with BWP-ID = 1 |
| 01 | BWP with BWP-ID = 2 |
| 10 | BWP with BWP-ID = 3 |
| 11 | BWP with BWP-ID = 4 |

600

| BWP indicator field | Cell #1 | Cell #2 |
|---|---|---|
| 00 | BWP #0 | BWP with BWP-ID = 1 |
| 01 | BWP with BWP-ID = 1 | BWP with BWP-ID = 2 |
| 10 | BWP with BWP-ID = 2 | BWP with BWP-ID = 3 |
| 11 | | BWP with BWP-ID = 4 |

| BWP indicator field | Cell #1 | Cell #2 |
| --- | --- | --- |
| 00 | BWP with BWP-ID = 1 | BWP with BWP-ID = 1 |
| 01 | BWP with BWP-ID = 2 | BWP with BWP-ID = 2 |
| 10 | | BWP with BWP-ID = 3 |
| 11 | | BWP with BWP-ID = 4 |

| BWP indicator field | Cell #1 | Cell #2 |
| --- | --- | --- |
| 00 | BWP #0 | BWP #0 |
| 01 | BWP with BWP-ID = 1 | BWP with BWP-ID = 1 |
| 10 | BWP with BWP-ID = 2 | BWP with BWP-ID = 2 |
| 11 | | |

| BWP indicator field | Cell #1 | Cell #2 |
| --- | --- | --- |
| 00 | BWP #0 | BWP #0 |
| 01 | BWP with BWP-ID = 1 | BWP with BWP-ID = 1 |
| 10 | BWP with BWP-ID = 2 | BWP with BWP-ID = 2 |
| 11 | | BWP with BWP-ID = 3 |

| BWP indicator field | Cell #1 | Cell #2 |
| --- | --- | --- |
| 00 | BWP with BWP-ID = 1 | BWP with BWP-ID = 1 |
| 01 | BWP with BWP-ID = 2 | BWP with BWP-ID = 2 |
| 10 | BWP with BWP-ID = 3 | BWP with BWP-ID = 3 |
| 11 | BWP with BWP-ID = 4 | BWP with BWP-ID = 4 |

| BWP indicator field | Cell #1 | Cell #2 |
| --- | --- | --- |
| 00 | 1st entry → BWP ID #1 | 1st entry → BWP ID #1 |
| 01 | 2nd entry → BWP ID #2 | 2nd entry → BWP ID #1 |
| 10 | 3rd entry → BWP ID #2 | 3rd entry → BWP ID #2 |
| 11 | 4th entry → BWP #0 | 4th entry → BWP #0 |

| BWP indicator field | Cell #1 | Cell #2 |
| --- | --- | --- |
| 00 | BWP with BWP-ID = 1 | BWP with BWP-ID = 1 |
| 01 | BWP with BWP-ID = 2 | BWP with BWP-ID = 2 |
| 10 | | BWP with BWP-ID = 3 |
| 11 | | BWP with BWP-ID = 4 |

| BWP indicator field | Cell #1 | Cell #2 |
| --- | --- | --- |
| 00 | BWP with BWP-ID = 1 | BWP with BWP-ID = 1 |
| 1 | BWP with BWP-ID = 2 | BWP with BWP-ID = 2 |

FIG. 6F

DOWNLINK CONTROL INFORMATION WITH BANDWIDTH PART INDICATOR FOR MULTI-CELL SCHEDULING

FIELD OF THE DISCLOSURE

Aspects of the present disclosure generally relate to wireless communication and to techniques and apparatuses for using downlink control information with a bandwidth part indicator for multi-cell scheduling.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving downlink control information (DCI) with a bandwidth part (BWP) indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The method may include communicating on the set of BWPs of the set of scheduled cells based at least in part on the mapping of the value to the set of BWPs.

Some aspects described herein relate to a method of wireless communication performed by a network node. The method may include transmitting DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The method may include communicating on the set of BWPs of the set of scheduled cells based at least in part on the mapping of the value to the set of BWPs.

Some aspects described herein relate to a UE for wireless communication. The UE may include a memory and one or more processors coupled to the memory. The one or more processors may be configured to receive DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The one or more processors may be configured to communicate on the set of BWPs of the set of scheduled cells based at least in part on the mapping of the value to the set of BWPs.

Some aspects described herein relate to a network node for wireless communication. The network node may include a memory and one or more processors coupled to the memory. The one or more processors may be configured to transmit DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The one or more processors may be configured to communicate on the set of BWPs of the set of scheduled cells based at least in part on the mapping of the value to the set of BWPs.

Some aspects described herein relate to a non-transitory computer-readable medium that stores a set of instructions for wireless communication by a UE. The set of instructions, when executed by one or more processors of the UE, may cause the UE to receive DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The set of instructions, when executed by one or more processors of the UE, may cause the UE to communicate on the set of BWPs of the set of scheduled cells based at least in part on the mapping of the value to the set of BWPs.

Some aspects described herein relate to a non-transitory computer-readable medium that stores a set of instructions for wireless communication by a network node. The set of instructions, when executed by one or more processors of the network node, may cause the network node to transmit DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The set of instructions, when executed by one or more processors of the network node, may cause the network node to communicate on the set of BWPs of the set of scheduled cells based at least in part on the mapping of the value to the set of BWPs.

Some aspects described herein relate to an apparatus for wireless communication. The apparatus may include means for receiving DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The apparatus may include means for communicating on the set of BWPs of the set of scheduled cells based at least in part on the mapping of the value to the set of BWPs.

Some aspects described herein relate to an apparatus for wireless communication. The apparatus may include means for transmitting DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The apparatus may include means for communicating on the set of BWPs of the set of scheduled cells based at least in part on the mapping of the value to the set of BWPs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6G are diagrams illustrating an example associated with using DCI with a BWP indicator for multi-cell scheduling, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
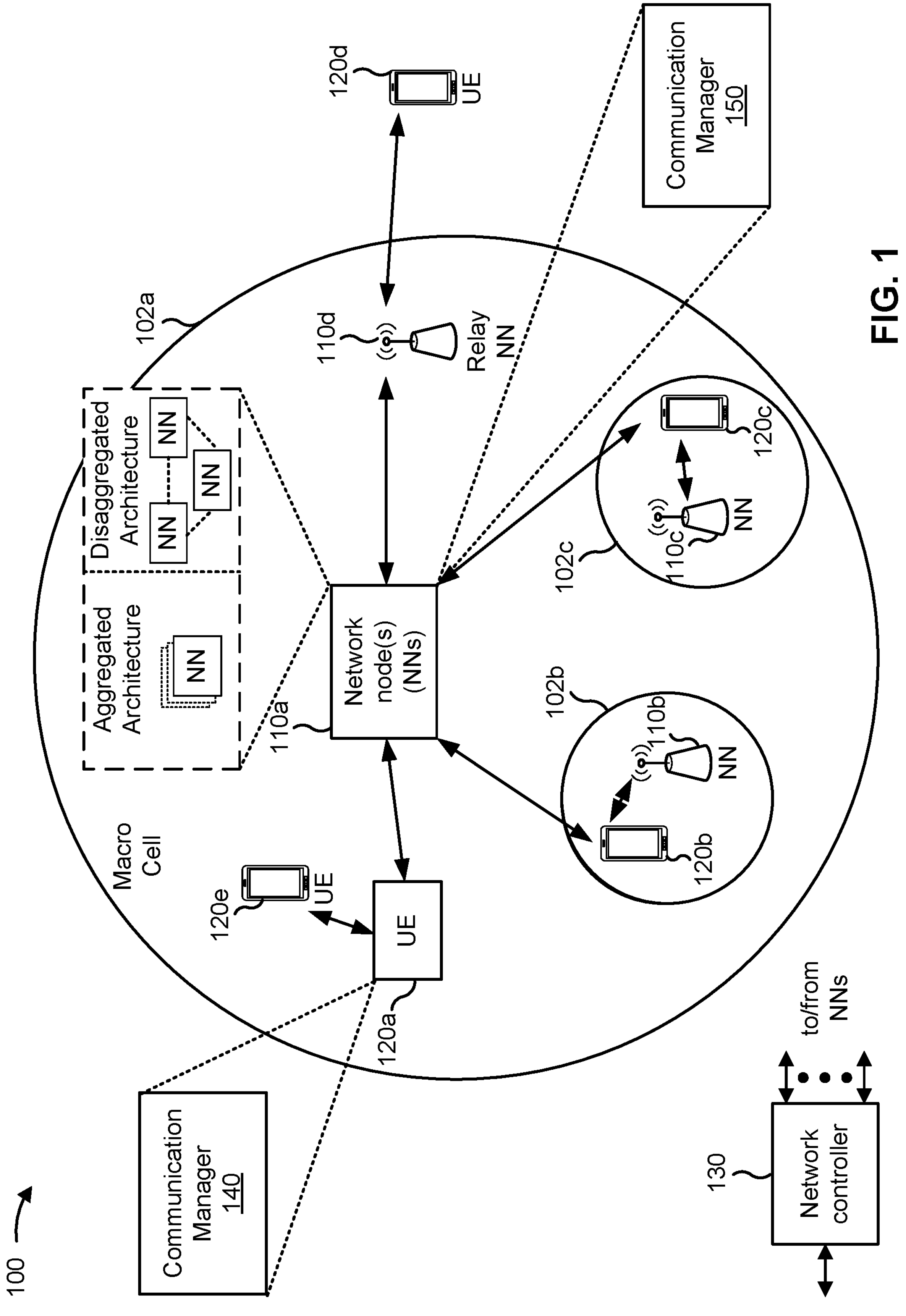
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive downlink control information (DCI) with a bandwidth part (BWP) indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell; and communicate on the set of BWPs of the set of scheduled cells based at least in part on the mapping of the value to the set of BWPs. Additionally, or alternatively, the communication manager 140 may perform one or more other operations described herein.

In some aspects, the network node 110 may include a communication manager 150. As described in more detail elsewhere herein, the communication manager 150 may transmit DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell; and communicate on the set of BWPs of the set of scheduled cells based at least in part on the mapping of the value to the set of BWPs. Additionally, or alternatively, the communication manager 150 may perform one or more other operations described herein.

As indicated above, FIG. 1 is provided as an example. Other examples may differ from what is described with regard to FIG. 1.

Figure 2:
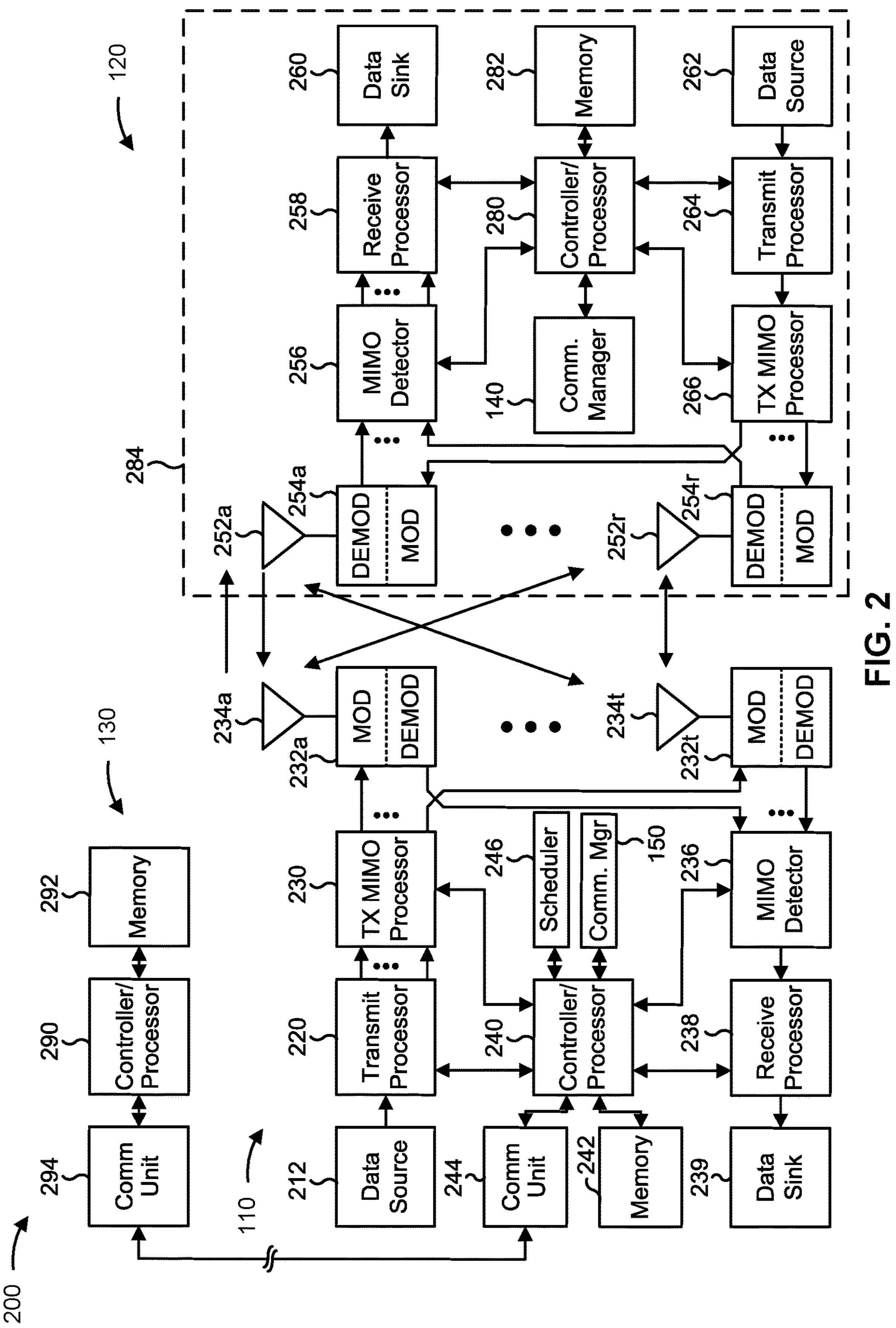
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 6A-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 6A-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with using downlink control information with a bandwidth part indicator for multi-cell scheduling, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell; and/or means for communicating on the set of BWPs of the set of scheduled cells based at least in part on the mapping of the value to the set of BWPs. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell; and/or means for communicating on the set of BWPs of the set of scheduled cells based at least in part on the mapping of the value to the set of BWPs. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
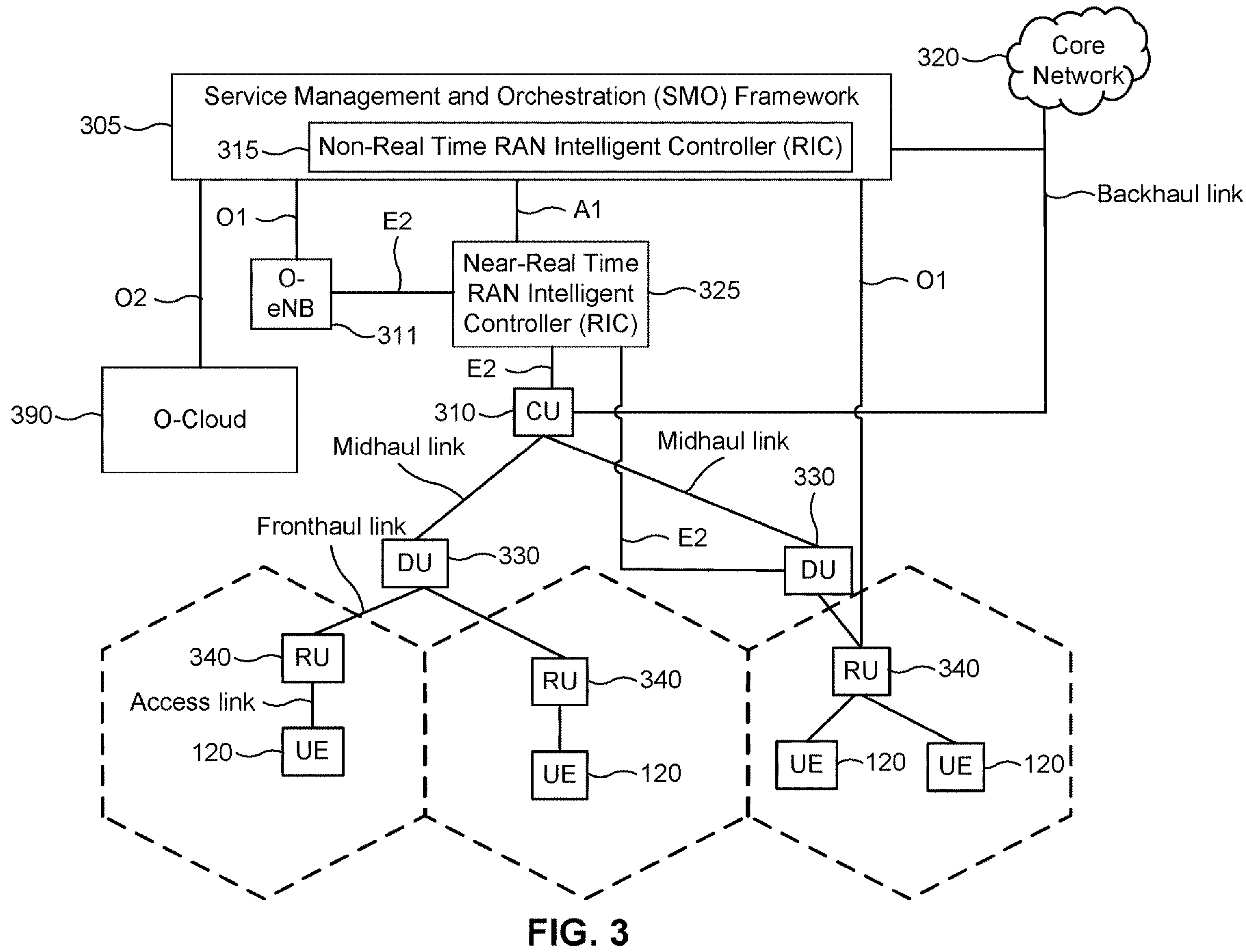
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
FIG. 4 is a diagram illustrating an example of a bandwidth part (BWP) indicator, in accordance with the present disclosure.

FIG. 4 is a diagram illustrating an example 400 of a bandwidth part (BWP) indicator, in accordance with the present disclosure. As shown in FIG. 4, a network node 110 and a UE 120 may communicate with one another.

A network node may transmit downlink control information (DCI) that includes a BWP indicator field conveying a BWP indicator. The BWP indicator may be a value or codepoint, such as a two-bit value. The two-bit value can be mapped to a BWP identifier of a BWP. For example, as shown in FIG. 4, and by table 450, a BWP indicator field value "00" maps to a BWP identifier #0 of a BWP. When there are two UE-specific BWPs (e.g., with BWP identifiers #1 and #2), a UE can interpret a BWP indicator field value in ascending order of BWP identifier values. In contrast, as shown by table 455, when there are 4 UE-specific BWPs (e.g., with BWP identifiers #1 through #4), a UE can interpret the BWP indicator field value in accordance with Table 7.3.1.1.2-1 of 3GPP Technical Specification (TS) 38.212, version 16.4.0. However, when there are 4 UE-specific BWPs configured, the BWP indicator cannot indicate BWP identifier #0 (e.g., which is a UE-common BWP), which limits deployment flexibility.

As indicated above, FIG. 4 is provided as an example. Other examples may differ from what is described with respect to FIG. 4.

Figure 5:
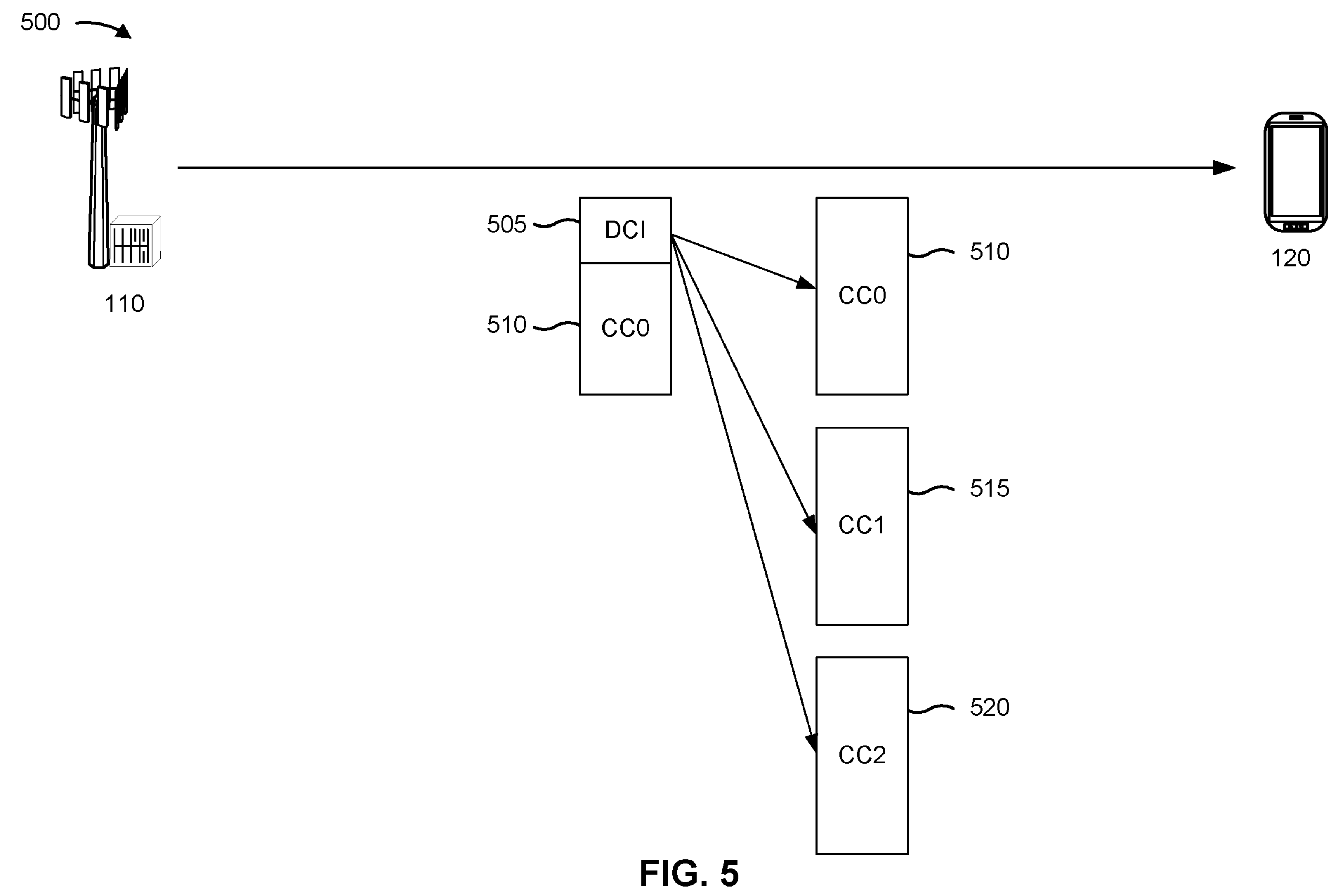
FIG. 5 is a diagram illustrating an example of downlink control information (DCI) that schedules multiple cells, in accordance with the present disclosure.

FIG. 5 is a diagram illustrating an example 500 of DCI that schedules multiple cells, in accordance with the present disclosure. As shown in FIG. 5, a network node 110 and a UE 120 may communicate with one another (e.g., directly or via one or more network nodes).

The network node 110 may transmit, to the UE 120 (e.g., directly or via one or more network nodes), DCI 505 that is able to schedule multiple communications for the UE 120. In other words, the DCI 505 is a multi-cell scheduling DCI in that the DCI 505 has a format that allows scheduling multiple communications, but may only schedule a single communication in some scenarios. The multiple communications may be scheduled for at least two different cells. In some cases, a cell may be referred to as a component carrier (CC). In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some aspects, the DCI 505 may be cross-carrier scheduling DCI, and may or may not be self-carrier scheduling DCI. In some aspects, the DCI 505 that carries communications in at least two cells may be referred to as combination DCI.

In example 500, the DCI 505 schedules a communication for a first cell 510 that carries the DCI 505 (shown as CC0), schedules a communication for a second cell 515 that does not carry the DCI 505 (shown as CC1), and schedules a communication for a third cell 520 that does not carry the DCI 505 (shown as CC2). In some aspects, the DCI 505 may schedule communications on a different number of cells than shown in FIG. 5 (e.g., one cell, two cells, four cells, five cells, and so on). The number of cells may be greater than or equal to two. In some examples, the first cell 510 that carries the DCI 505 is referred to as a "scheduling cell" and the first cell 510, second cell 515, and third cell 520 that are scheduled by the DCI 505 are referred to as "scheduled cells." In example 500, the first cell 510 is both a scheduling cell and a scheduled cell. In some examples, the scheduled cells may have the same or different bandwidths. For example, first cell 510 and third cell 520 may each have a bandwidth of 5 megahertz (MHz) and second cell 515 may have a bandwidth of 10 MHz. In another example, first cell 510, second cell 515, and third cell 520 may each have a bandwidth of 100 MHz.

A communication scheduled by the DCI 505 may include a data communication, such as a physical downlink shared channel (PDSCH) communication or a physical uplink shared channel (PUSCH) communication. For a data communication, the DCI 505 may schedule a single transport block (TB) across multiple cells or may separately schedule multiple TBs in the multiple cells. Additionally, or alternatively, a communication scheduled by the DCI 505 may include a reference signal, such as a channel state information reference signal (CSI-RS) or a sounding reference signal (SRS). For a reference signal, the DCI 505 may trigger a single resource for reference signal transmission across multiple cells or may separately schedule multiple resources for reference signal transmission in the multiple cells. In some cases, scheduling information in the DCI 505 may be indicated once and reused for multiple communications (e.g., on different cells), such as a modulation and coding scheme (MCS), a resource to be used for acknowledgement (ACK) or negative acknowledgement (NACK) of a communication scheduled by the DCI 505, and/or a resource allocation for a scheduled communication, to conserve signaling overhead.

As indicated above, FIG. 5 is provided as an example. Other examples may differ from what is described with respect to FIG. 5.

As described above, a UE may use a table for BWP indicator interpretation. The table may store information identifying BWP field values and associated BWPs that map to the BWP field values. In this case, when the network node transmits DCI with a BWP field, such as a DCI format 0_X (e.g., DCI format 0_1, 0_2, or 0_3) or a DCI format 1_X (e.g., DCI format 1_1, 1_2, or 1_3), a UE may use a codepoint from the BWP field (e.g., a value) to determine a BWP on which a communication is scheduled. In some cases, UEs may communicate on a plurality of cells, each of which is associated with a BWP or a set of BWPs (e.g., a downlink BWP and an uplink BWP). However, the configured table includes information mapping codepoints to only a single active BWP. It is possible for the network node to include a plurality of codepoints in one or more DCIs to indicate a plurality of BWPs for a plurality of cells. However, transmitting information identifying a plurality of codepoints results in excessive overhead for TCI state configuration.

Some aspects described herein provide for BWP configuration for multi-cell scheduling. For example, a UE may receive DCI including a BWP indicator field with a value that maps to a set of BWPs for a set of co-scheduled cells (e.g., cells scheduled by the DCI). In this case, the UE may use a mapping (e.g., a mapping rule from which the UE can construct a mapping table or a configured mapping table that is configured by the network node) to map the value of the BWP indicator field to a plurality of BWPs for a plurality of cells. In this way, the network node and the UE can perform BWP configuration using a codepoint (e.g., a value with a bitwidth of $\log_2(n_{BWP})$, where $n_{BWP}$ represents a maximum quantity of UE-specific BWPs for each cell) rather than a plurality of codepoints, thereby reducing a utilization of network resources. By using a mapping rule, the network node and the UE reduce signaling by enabling the network node to provide a parameter for the mapping rule (e.g., a value or an ordering that the UE is to use) and enabling the UE to construct a mapping table without the network node conveying the whole mapping table via signaling. By using a configured mapping table (e.g., that is configured by the network node), the network node reduces processing resource utilization by the UE by explicitly identifying the mapping table, thereby obviating a need for the UE to construct a mapping table.

Figure 6A:
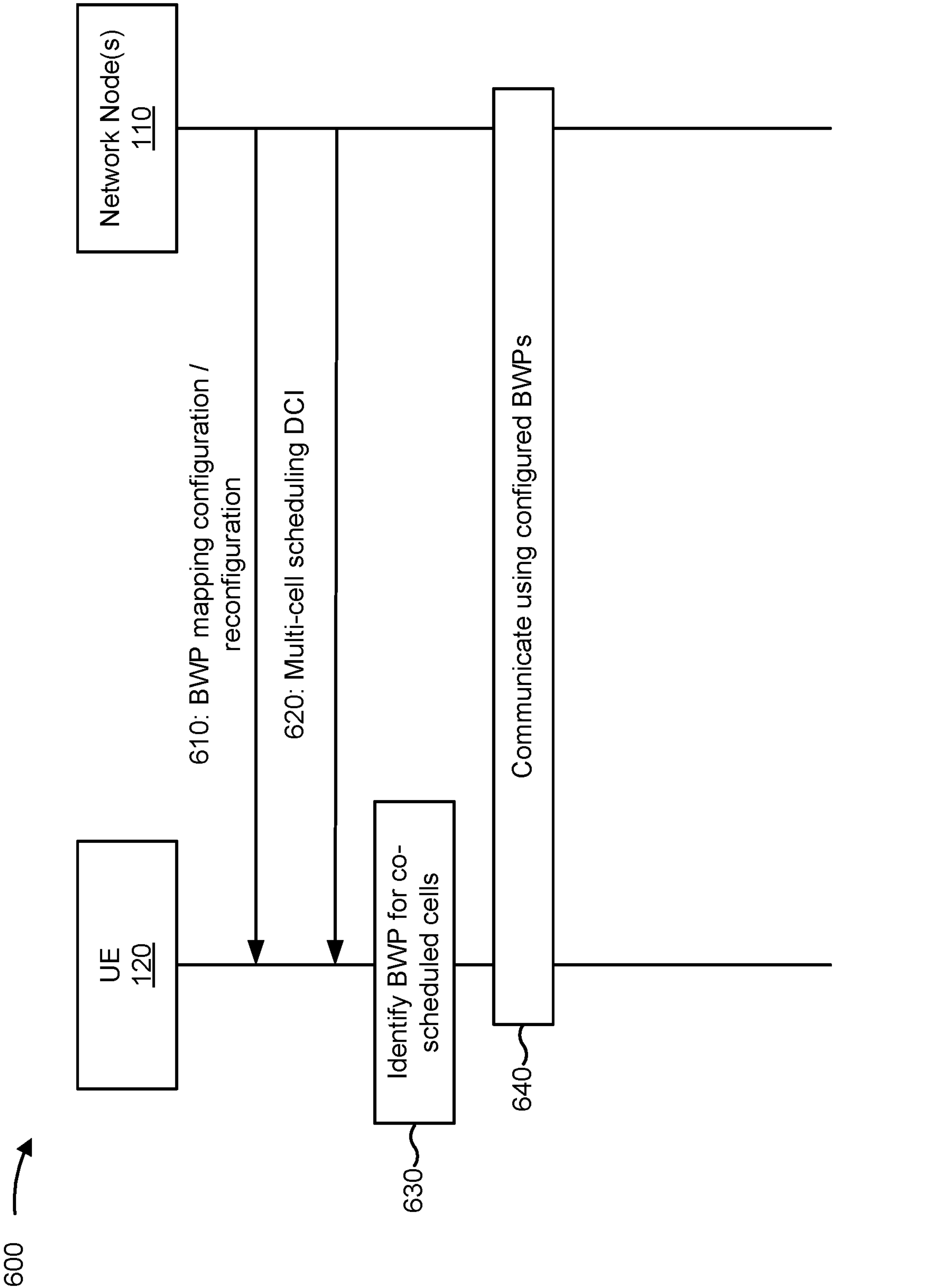

In some aspects, the network node may configure or reconfigure a table storing a mapping between codepoints and sets of BWPs for sets of co-scheduled cells, or can configure or reconfigure a rule (e.g., from which the UE can construct the table). For example, the network node may transmit first signaling to configure a table of mappings and second signaling to reconfigure the table of mappings (e.g., when a BWP is to be activated or deactivated). In this way, the network node is provided with flexibility in deploying the UE with differing quantities of co-scheduled cells and/or different combinations of BWPs FIGS. 6A-6G are diagrams illustrating an example 600 associated with configuring a transmission configuration indicator state for multi-cell scheduling, in accordance with the present disclosure. As shown in FIG. 6A, example 600 includes communication between a network node 110 and a UE 120.

As further shown in FIG. 6A, and by reference number 610, the UE 120 may receive BWP mapping configuration or reconfiguration information. For example, the UE 120 may receive, from the network node 110, information associated with configuring a mapping of BWPs to values of a BWP indicator field and/or altering a configured mapping of BWPs to values of a BWP indicator field. In this case, the UE 120 may receive radio resource control (RRC) signaling associated with an initial configuration of the mapping of BWPs to values of the BWP indicator field. Similarly, the UE 120 may receive medium access control (MAC) control element (CE) signaling associated with altering a configuration of the mapping of BWPs to values of the BWP indicator field. For example, the UE 120 may receive information activating or deactivating a BWP, which may cause the UE 120 to update a mapping of BWPs to values of the BWP indicator field. Although some aspects are described herein in terms of a table of mappings, mappings may take the form of another type of data structure or relationship.

In some aspects, the UE 120 may be configured with a set of mapping rules and/or an associated threshold for a plurality of cells. For example, the UE 120 may be configured, via RRC signaling, with a threshold quantity of UE-specific BWPs (e.g., a parameter $n_{BWP,RRC}$, such as $n_{BWP,RRC} \leq 3$) and, based at least in part on whether the threshold quantity of UE-specific BWPs is exceeded for a cell, may apply a mapping rule to the cell and/or one or more co-scheduled cells, as described below. Additionally, or alternatively, the UE 120 may be configured with a conditional field interpretation in which the UE 120 is configured with a rule for interpreting the BWP indicator field for a first cell based at least in part on whether the threshold quantity of UE-specific BWPs is exceeded for a second cell, as described below. In some aspects, the UE 120 may be configured with a rule that is independent of a quantity of UE-specific BWPs that is configured for a co-scheduled cell. For example, the UE 120 may be configured such that BWP indicator fields map to cells in accordance with, for example, Table 7.3.1.1.2-1 without a threshold condition being satisfied (e.g., without having a value configured for $n_{BWP,RRC}$), as described below.

In some aspects, the UE 120 may be configured with a set of BWP identifiers for one or more cells for which co-scheduling is possible. For example, the UE 120 may receive RRC signaling identifying a group of lists of BWP identifiers for a group of cells (e.g., each cell has a corresponding list of BWP identifiers). In this case, the UE 120 may store the group of lists of BWP identifiers as a BWP mapping table that the UE 120 can use to map a received BWP indicator field value to a set of BWP identifiers for a set of co-scheduled cells. In some aspects, the UE 120 may receive information identifying a single BWP identifier that maps to a plurality of BWP indicator field values (e.g., for a particular cell, both a first BWP indicator field value and a second BWP indicator field value map to the same BWP). Similarly, the UE 120 may receive information identifying a single BWP indicator field value that maps to a plurality of BWP identifiers for a single cell (e.g., mapping information identifying a first BWP identifier for an uplink BWP and a second BWP identifier for a downlink BWP).

As further shown in FIG. 6A, and by reference number 620, the UE 120 may receive a multi-cell scheduling DCI. For example, the UE 120 may receive, from the network node 110 and on a scheduling cell, DCI associated with scheduling communications on a set of scheduled cells, which may be referred to as "co-scheduled cells." In some aspects, the UE 120 may receive DCI that includes a BWP indicator field with a value (e.g., a codepoint) that maps to a set of BWPs that are to be used for communications on a set of (co-scheduled) cells scheduled by the DCI. Additionally, or alternatively, the UE 120 may receive DCI indicating a BWP switch for one or more cells. For example, the UE 120 may, while operating on a first BWP for a particular cell, receive DCI indicating that the UE is to switch to using a second BWP for the particular cell (e.g., to transmit a PUSCH or to receive a PDSCH). In this case, the DCI may be a cross-carrier scheduling type of DCI, such as DCI formats 11, 01, 12, or 02, among other examples. Additionally, or alternatively, the UE 120 may, while operating on a first BWP for a particular cell, receive DCI indicating that the UE is to switch to using both the first BWP and a second BWP for the particular cell. In this case, the DCI may be a multi-cell scheduling type of DCI, such as DCI formats 0_X or 1_X, among other examples).

As further shown in FIG. 6A, and by reference number 630, the UE 120 may identify a set of BWPs for a set of co-scheduled cells. For example, the UE 120 may map a value in a BWP indicator field of the received multi-cell scheduling DCI to a set of BWPs for a set of cells scheduled by the multi-cell scheduling DCI. Additionally, or alternatively, the UE 120 may determine a BWP switch for a cell scheduled by the DCI (e.g., a cross-carrier scheduling DCI or a multi-cell scheduling DCI). In this case, the UE 120 may identify a behavior for monitoring for subsequent DCI during a BWP switching gap, as described below.

In some aspects, the UE 120 may interpret the BWP indicator field independently for a plurality of cells. For example, as shown in FIG. 6B and when the UE 120 is configured with a threshold parameter $n_{BWP,RRC}$, such as $n_{BWP,RRC} \leq 3$, a first cell has 2 UE-specific BWPs (BWP identifier #1 and BWP identifier #2), which is less than the configured threshold. In this case, the UE 120 may interpret BWP indicators in ascending order of BWP identifiers, as shown. In contrast, a second cell has 4 UE-specific BWPs (BWP identifiers #1 through #4), which is greater than the threshold value. In this case, BWP indicators are mapped in accordance with Table 7.3.1.1.2-1 of 3GPP TS 38.212 version 16.4.0. In other words, the UE 120 evaluates whether $n_{BWP,RRC} \leq 3$ separately for the first cell and the second cell and selects from a pair of mapping rules (e.g., ascending order based mapping, and Table 7.31.1.2-1 based mapping, as a result of the evaluation).

In some aspects, the UE 120 may interpret the BWP indicator field, collectively, for the plurality of cells. For example, as shown in FIG. 6C, the UE 120 may determine which of the above-mentioned pair of rules to use for the mapping of the BWP indicator field for the first cell and the second cell based at least in part on whether either of the first cell and the second cell exceeds the configured threshold parameter. In this case, as shown in the top table in FIG. 6C, in one example, the first cell has 2 UE-specific BWPs, which satisfies the threshold parameter $n_{BWP,RRC} \leq 3$, and the second cell has 4 UE-specific BWPs, which does not satisfy the threshold parameter $n_{BWP,RRC} \leq 3$. Accordingly, the UE 120 may select the above-mentioned second rule for both the first cell and the second cell (based at least in part on the second cell not satisfying the threshold parameter) and interpret the BWP indicator field according to Table 7.3.1.1.2-1. In contrast, as shown in the bottom table in FIG. 6C, in another example, the first cell has 2 UE-specific BWPs, which satisfies the threshold parameter $n_{BWP,RRC} \leq 3$, and the second cell has 2 UE-specific BWPs, which also satisfies the threshold parameter $n_{BWP,RRC} \leq 3$. Accordingly, the UE 120 may select the above-mentioned first rule for both the first cell and the second cell (based at least in part on both cells satisfying the threshold parameter) and interpret the BWP indicator field as $n_{BWP}=n_{BWP,RRC}+1$ (e.g., in ascending order of BWP identifier).

In another example, as shown in FIG. 6D, the above-mentioned pair of rules may be reversed, such that the UE 120 may determine the mapping of the BWP indicator field for the first cell and the second cell based at least in part on either of the first cell or the second cell not exceeding the configured threshold parameter. In this case, as shown in the top table in FIG. 6D, the first cell has 2 UE-specific BWPs, which satisfies the threshold parameter $n_{BWP,RRC} \leq 3$, and the second cell has 4 UE-specific BWPs, which does not satisfy the threshold parameter $n_{BWP,RRC} \leq 3$. Accordingly, the UE 120 may interpret the BWP indicator field as $n_{BWP}=n_{BWP,RRC}+1$ (e.g., in ascending order of BWP identifier). In contrast, as shown in the bottom table in FIG. 6D, the first cell has 2 UE-specific BWPs, which does not satisfy the threshold parameter $n_{BWP,RRC} \leq 3$, and the second cell has 2 UE-specific BWPs, which also does not satisfy the threshold parameter $n_{BWP,RRC} \leq 3$. Accordingly, the UE 120 may interpret the BWP indicator field according to Table 7.3.1.1.2-1 for both the first cell and the second cell. Although two mapping rules (and an associated threshold condition) are described for two cells, it is contemplated that other mapping rules and associated threshold conditions may be used and that other quantities of cells may be used.

In some aspects, when the UE 120 identifies a mapping of a BWP indicator field to a corresponding entry in a mapping table (e.g., a constructed mapping table according to a rule, as described above, or a configured mapping table according to a received configuration, as described below), the UE 120 may identify a blank entry as the corresponding entry in the table. For example, the UE 120 may be configured with a BWP identifier for a first cell for a BWP indicator field value, but with a null or blank entry for a second cell for the BWP indicator field value. In other words, in some cases, there may not be a BWP identifier in an entry of a mapping table, but the UE 120 may receive DCI with a BWP indicator field value pointing to the entry that lacks a BWP identifier.

In some aspects, the UE 120 may interpret an indication of a null or blank entry as indicating that a BWP switch is not signaled by the DCI for the cell that has the null or blank entry. Alternatively, the UE 120 may interpret an indication of a null or blank entry as indicating that a BWP switch is to be performed, for the particular cell, to a configured BWP. In other words, when the UE 120 is tuned to a first BWP for a first cell and receives DCI with a BWP indicator field value corresponding to a blank entry for the first cell, the UE 120 may determine that the network node 110 is signaling the UE 120 to transition from the first BWP to a second BWP for the first cell. In this case, UE 120 may identify the second BWP as an initial BWP, a default BWP, a first active BWP, an RRC configured BWP, or a next BWP (e.g., in ascending order or descending order of BWP identifier or frequency), among other examples. The identification of the second BWP may be configured by the network node 110 in RRC signaling or may be specified in a specification, among other examples. Alternatively, the UE 120 may interpret an indication of a null or blank entry as mapping to a different entry in a BWP mapping table. For example, with reference to the top table of FIG. 6D, when the UE 120 receives a BWP indicator field value of "11," which points to a blank entry for the first cell, the UE 120 may interpret the BWP indicator field value of "11," for the first cell, as pointing to an entry for BWP indicator field value "10" for the first cell. In other words, the UE 120 selects a sequentially next or previous BWP indicator field value to identify a non-blank entry for mapping. In this case, whether the UE 120 selects a next or previous BWP indicator field can be RRC configured, among other examples. In some aspects, the UE 120 may wrap-around within the BWP mapping table. For example, the UE 120 may select a next BWP indicator field "00" (which is sequentially after "11" with wrap-around).

In some aspects, the UE 120 may interpret a BWP indicator field based at least in part on a configured table (e.g., without evaluating a threshold parameter or determining a mapping rule). For example, as shown in FIG. 6E, and as described above, when the UE 120 is configured with a list of BWP identifiers for each cell, the UE 120 may directly map a BWP indicator field value to a BWP identifier. In this case, the UE 120 receives RRC signaling identifying a list of BWP identifiers for each cell (e.g., {1, 2, 2, 0} for cell #1 and {1, 1, 2, 0} for cell #2) and can map each BWP indicator field value to a set of BWPs associated with a set of BWP identifiers. For example, BWP indicator field value "00" maps to BWP identifier #1 for cell #1 and BWP identifier #1 for cell #2, and the BWP indicator field "01" maps to BWP identifier #2 for cell #1 and BWP identifier #1 for cell #2, among other examples.

In some aspects, the UE 120 may interpret a BWP indicator field without evaluating a condition, but using a configured rule. For example, as shown in FIG. 6F and as described above, the UE 120 may have been configured by the network node 110 to map BWP indicator field values to a plurality of co-scheduled cells in accordance with Table 7.3.1.1.2-1 (e.g., without evaluating a threshold parameter, such as $n_{BWP,RRC}$ as described above). In this case, as shown in FIG. 6F, the UE 120 can construct BWP indicator field mapping tables based at least in part on a quantity of UE-specific BWPs that are configured for each cell (e.g., but with each mapping table following Table 7.3.1.1.2-1, rather than conditionally following Table 7.3.1.1.2-1, as described with regard to FIGS. 6B and 6C). For example, as shown by the top table in FIG. 6F, the UE 120 constructs a first mapping table when a first cell has 2 UE-specific BWPs and the second cell has 4 UE-specific BWPs by following Table 7.3.1.1.2-1. Similarly, as shown by the bottom table in FIG. 6F, the UE 120 constructs a second mapping table when the first cell has 2 UE-specific BWPs and the second cell has 2 UE-specific BWPs, also by following Table 7.3.1.1.2-1.

As further shown in FIG. 6A, and by reference number 640, the UE 120 may communicate with the network node 110 using a set of configured BWPs. For example, the UE 120 may use the BWPs identified based at least in part on the BWP indicator field to communicate on the set of co-scheduled cells. In some aspects, the UE 120 may switch BWPs to communicate with the network node 110. For example, when the UE 120 is tuned to a first BWP for a particular cell and receives DCI indicating that the UE 120 is to use a second BWP for the particular cell, the UE 120 may switch from the first BWP to the second BWP for the particular cell.

In some aspects, a switching gap may occur when switching BWPs. For example, a period of time may elapse between being tuned to a first BWP for a particular cell and being tuned to a second BWP for the particular cell. In some aspects, the UE 120 may forgo monitoring for DCI (e.g., a physical downlink control channel (PDCCH) conveying the DCI) during the switching gap. For example, the UE 120 may not expect to monitor or receive DCI that can schedule data (e.g., DCI format 1_1, 0_1, 1_2, 0_2, 0_X, or 1_X for cross-carrier or multi-carrier scheduling) on the particular cell during the switching gap. In this switching gap, the network node 110 may refrain from transmitting DCI to the UE 120 to avoid a dropped communication.

Figure 6G:
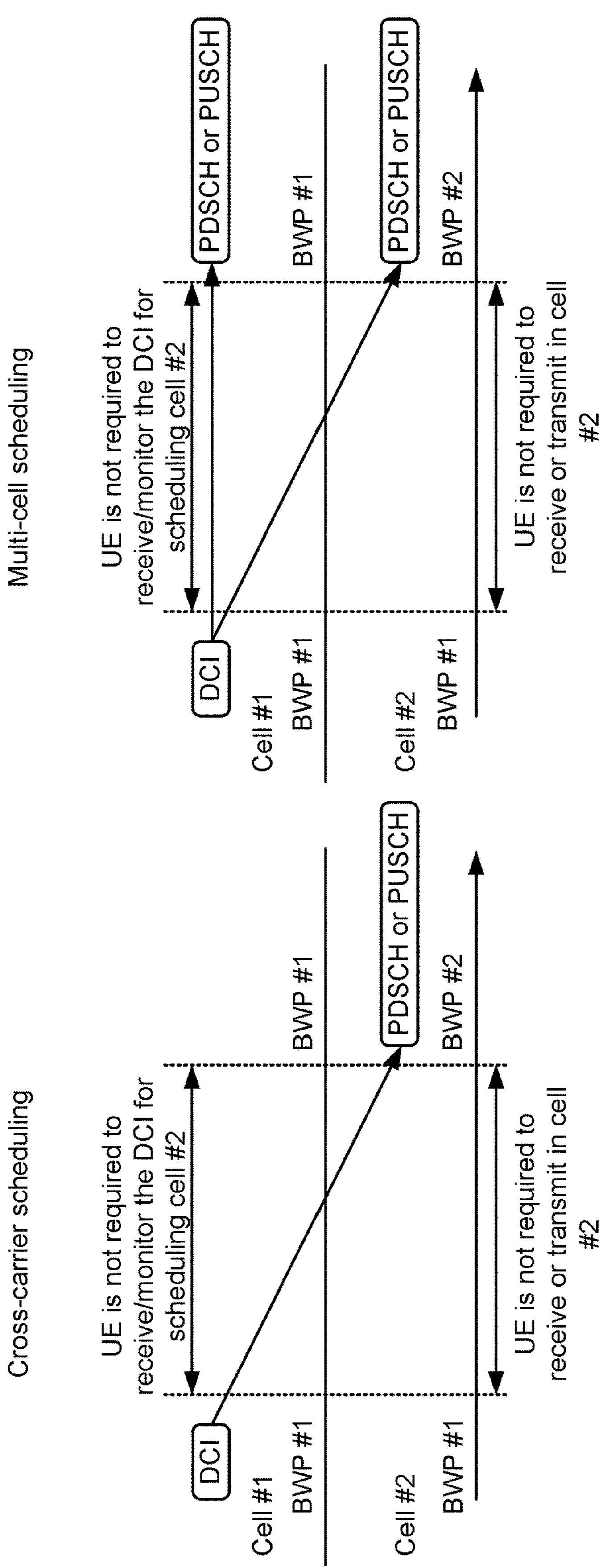

As an example, as shown in the top part of FIG. 6G, for cross-carrier scheduling, the UE 120 may forgo monitoring for DCI during a period of time when the UE 120 switches from having received DCI on a first BWP to monitoring for a PDSCH or transmitting a PUSCH on a second BWP. Similarly, as shown in the bottom part of FIG. 6G, for multi-carrier scheduling, the UE 120 may forgo monitoring for DCI during a period of time when the UE 120 switches from having received DCI on the first BWP to monitoring for a PDSCH or transmitting a PUSCH on both the first BWP and the second BWP. Additionally, or alternatively, the UE 120 may monitor for DCI and the network node 110 may transmit DCI (e.g., DCI format 0_X or 1_X) during the switching gap to receive scheduling information for one or more other scheduled cells (e.g., that are not subject to the BWP switch or if a BWP switch does not change a payload of the DCI format), but may not monitor for or be scheduled by DCI to receive scheduling information for a cell that is subject to the BWP switch. In this case, the UE 120 may treat DCI, received during the switching gap, that schedules the cell that is subject to the BWP switch as an error case.

Although the UE 120 and the network node 110 may not communicate DCI for scheduling data, other communications or communication tasks may occur during the switching gap. In other words, if a UE 120 detects any DCI format with a BWP indicator field that indicates an active downlink BWP change for a cell, the UE is not required to monitor a DCI format for the cell with the active downlink BWP change during a time duration from the end of the third symbol of a slot where the UE 120 receives the PDCCH that includes the DCI format in a scheduling cell until the beginning of a slot indicated by the slot offset value of the time domain resource assignment field in the DCI format. Additionally, or alternatively, for a cell where a UE 120 changes an active downlink BWP due to a BWP inactivity timer expiration and for accommodating a delay in the active downlink BWP change or the active uplink BWP change by the UE 120, the UE 120 is not required to monitor a DCI format for the cell where the UE 120 changes the active downlink BWP and for accommodating the delay during a time duration from the beginning of a subframe for FR1, or of half of a subframe for FR2, that immediately after the BWP inactivity timer expires until the beginning of a slot where the UE can receive or transmit.

Additionally, or alternatively, if a UE 120 detects any DCI format with a BWP indicator field that indicates an active downlink BWP change for a cell, the UE 120 is not required to monitor a DCI format 0_X or 1_X configured for a set of cells including the cell with the active downlink BWP change during a time duration from the end of the third symbol of a slot where the UE 120 receives the PDCCH that includes the DCI format in a scheduling cell until the beginning of a slot indicated by the slot offset value of the time domain resource assignment field in the DCI format. Additionally, or alternatively, for a cell where a UE 120 changes an active downlink BWP due to a BWP inactivity timer expiration and for accommodating a delay in the active downlink BWP change or the active uplink BWP change required by the UE 120, the UE 120 is not required to monitor a DCI format 0_X or 1_X configured for a set of cells including the cell where the UE 120 changes the active downlink BWP and for accommodating the delay during a time duration from the beginning of a subframe for FR1, or of half of a subframe for FR2, that immediately after the BWP inactivity timer expires until the beginning of a slot where the UE 120 can receive or transmit.

As indicated above, FIGS. 6A-6G are provided as an example. Other examples may differ from what is described with respect to FIGS. 6A-6G.

Figure 7:
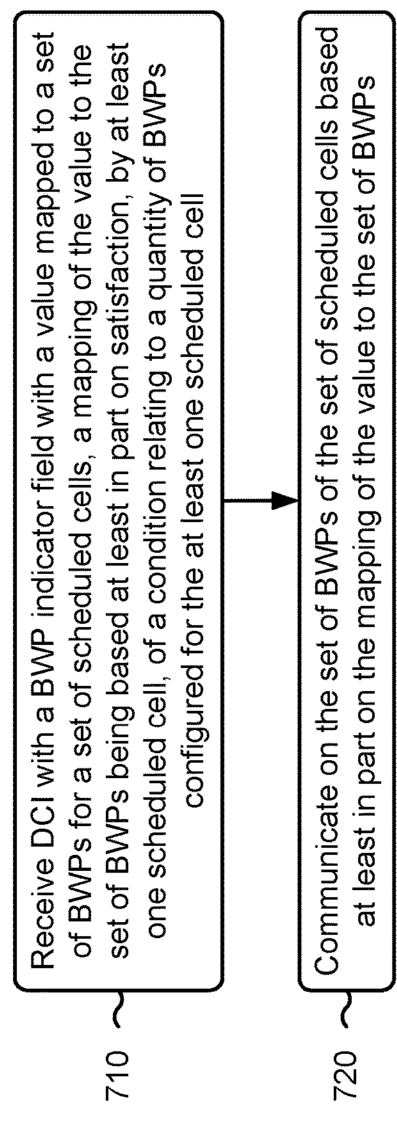
FIG. 7 is a diagram illustrating an example process performed, for example, by a UE, in accordance with the present disclosure.
Figure 7:

FIG. 7 is a diagram illustrating an example process 700 performed, for example, by a UE, in accordance with the present disclosure. Example process 700 is an example where the UE (e.g., UE 120) performs operations associated with using DCI with a BWP indicator for multi-cell scheduling.

As shown in FIG. 7, in some aspects, process 700 may include receiving DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell (block 710). For example, the UE (e.g., using reception component 902 and/or communication manager 906, depicted in FIG. 9) may receive DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell, as described above.

As further shown in FIG. 7, in some aspects, process 700 may include communicating on the set of BWPs of the set of scheduled cells based at least in part on the mapping of the value to the set of BWPs (block 720). For example, the UE (e.g., using reception component 902, transmission component 904, and/or communication manager 906, depicted in FIG. 9) may communicate on the set of BWPs of the set of scheduled cells based at least in part on the mapping of the value to the set of BWPs, as described above.

Process 700 may include additional aspects, such as any single aspect or any combination of aspects described below and/or in connection with one or more other processes described elsewhere herein.

In a first aspect, the mapping is based at least in part on all cells of the set of scheduled cells satisfying the condition.

In a second aspect, alone or in combination with the first aspect, the mapping is based at least in part on one or more cells of the set of scheduled cells satisfying the condition.

In a third aspect, alone or in combination with one or more of the first and second aspects, process 700 includes receiving radio resource control signaling identifying a threshold for the quantity of BWPs configured for the at least one scheduled cell, wherein the condition is related to the quantity of BWPs configured for the at least one scheduled cell not exceeding the identified threshold.

In a fourth aspect, alone or in combination with one or more of the first through third aspects, the mapping is based at least in part on a BWP indicator configuration specified in a specification table.

In a fifth aspect, alone or in combination with one or more of the first through fourth aspects, the mapping is based at least in part on an order of BWP identifier values for the set of BWPs.

In a sixth aspect, alone or in combination with one or more of the first through fifth aspects, the value maps to at least one null entry in a BWP table for a BWP, of the set of BWPs, the BWP being for a scheduled cell of the set of scheduled cells.

In a seventh aspect, alone or in combination with one or more of the first through sixth aspects, the DCI indicates no BWP switch for the BWP based at least in part on the value mapping to the at least one null entry.

In an eighth aspect, alone or in combination with one or more of the first through seventh aspects, the DCI indicates a BWP switch for the BWP based at least in part on the value mapping to the at least one null entry.

In a ninth aspect, alone or in combination with one or more of the first through eighth aspects, the value maps to another entry in the BWP table based at least in part on the value mapping to the at least one null entry.

In a tenth aspect, alone or in combination with one or more of the first through ninth aspects, process 700 includes receiving radio resource control (RRC) signaling including a parameter associated with identifying a set of BWP identifiers for a group of cells, the group of cells including the set of scheduled cells, wherein each BWP identifier, of the set of BWP identifiers, maps to at least one possible value for the BWP indicator field, the mapping being based at least in part on the set of BWP identifiers for the group of cells.

In an eleventh aspect, alone or in combination with one or more of the first through tenth aspects, the UE is configured to forgo monitoring, during a switching gap between receiving the DCI and communicating on the set of BWPs of the set of scheduled cells, of a scheduling cell on which the DCI is received.

In a twelfth aspect, alone or in combination with one or more of the first through eleventh aspects, the UE is configured to monitor, during a switching gap between receiving the DCI and communicating on the set of BWPs of the set of scheduled cells, a scheduling cell on which the DCI is received based at least in part on the DCI not having an indicator of a change to a payload of a DCI format of the DCI.

In a thirteenth aspect, alone or in combination with one or more of the first through twelfth aspects, process 700 includes receiving, during the switching gap, scheduling information for one or more of the scheduling cells, of the set of scheduled cells, for which a BWP switch is not indicated.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
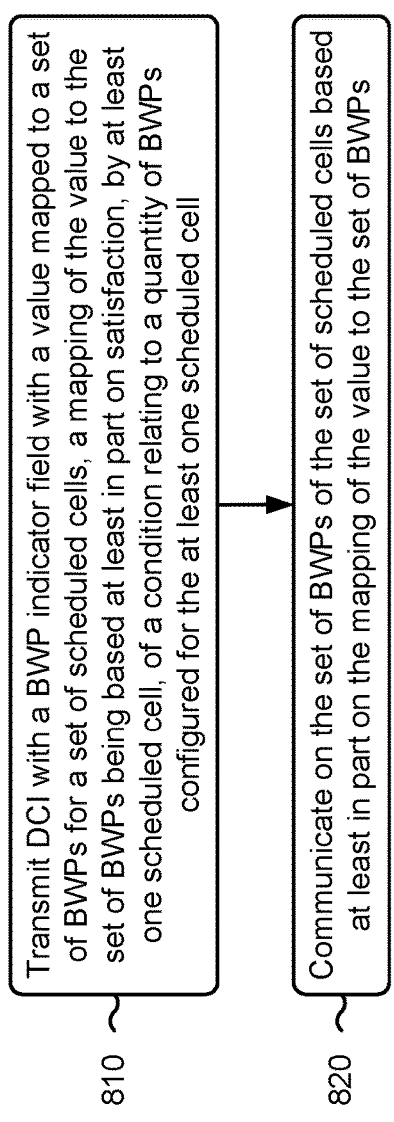
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with using DCI with a BWP indicator for multi-cell scheduling.

As shown in FIG. 8, in some aspects, process 800 may include transmitting DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell (block 810). For example, the network node (e.g., using transmission component 1004 and/or communication manager 1006, depicted in FIG. 10) may transmit DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell, as described above.

As further shown in FIG. 8, in some aspects, process 800 may include communicating on the set of BWPs of the set of scheduled cells based at least in part on the mapping of the value to the set of BWPs (block 820). For example, the network node (e.g., using reception component 1002, transmission component 1004, and/or communication manager 1006, depicted in FIG. 10) may communicate on the set of BWPs of the set of scheduled cells based at least in part on the mapping of the value to the set of BWPs, as described above.

Process 800 may include additional aspects, such as any single aspect or any combination of aspects described below and/or in connection with one or more other processes described elsewhere herein.

In a first aspect, the mapping is based at least in part on all cells of the set of scheduled cells satisfying the condition.

In a second aspect, alone or in combination with the first aspect, the mapping is based at least in part on one or more cells of the set of scheduled cells satisfying the condition.

In a third aspect, alone or in combination with one or more of the first and second aspects, process 800 includes transmitting radio resource control signaling identifying a threshold for the quantity of BWPs configured for the at least one scheduled cell, wherein the condition is related to the quantity of BWPs configured for the at least one scheduled cell not exceeding the identified threshold.

In a fourth aspect, alone or in combination with one or more of the first through third aspects, the mapping is based at least in part on a BWP indicator configuration specified in a specification table.

In a fifth aspect, alone or in combination with one or more of the first through fourth aspects, the mapping is based at least in part on an order of BWP identifier values for the set of BWPs.

In a sixth aspect, alone or in combination with one or more of the first through fifth aspects, the value maps to at least one null entry in a BWP table for a BWP, of the set of BWPs, the BWP being for a scheduled cell of the set of scheduled cells.

In a seventh aspect, alone or in combination with one or more of the first through sixth aspects, the DCI indicates no BWP switch for the BWP based at least in part on the value mapping to the at least one null entry.

In an eighth aspect, alone or in combination with one or more of the first through seventh aspects, the DCI indicates a BWP switch for the BWP based at least in part on the value mapping to the at least one null entry.

In a ninth aspect, alone or in combination with one or more of the first through eighth aspects, the value maps to another entry in the BWP table based at least in part on the value mapping to the at least one null entry.

In a tenth aspect, alone or in combination with one or more of the first through ninth aspects, process 800 includes transmitting RRC signaling including a parameter associated with identifying a set of BWP identifiers for a group of cells, the group of cells including the set of scheduled cells, wherein each BWP identifier, of the set of BWP identifiers, maps to at least one possible value for the BWP indicator field, the mapping being based at least in part on the set of BWP identifiers for the group of cells.

In an eleventh aspect, alone or in combination with one or more of the first through tenth aspects, the network node is configured to forgo transmitting, during a switching gap between receiving the DCI and communicating on the set of BWPs of the set of scheduled cells, on a scheduling cell on which the DCI is received.

In a twelfth aspect, alone or in combination with one or more of the first through eleventh aspects, the network node is configured to transmit, during a switching gap between receiving the DCI and communicating on the set of BWPs of the set of scheduled cells, on a scheduling cell on which the DCI is transmitted based at least in part on the DCI not having an indicator of a change to a payload of a DCI format of the DCI.

In a thirteenth aspect, alone or in combination with one or more of the first through twelfth aspects, process 800 includes transmitting, during the switching gap, scheduling information for one or more of the scheduling cells, of the set of scheduled cells, for which a BWP switch is not indicated.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
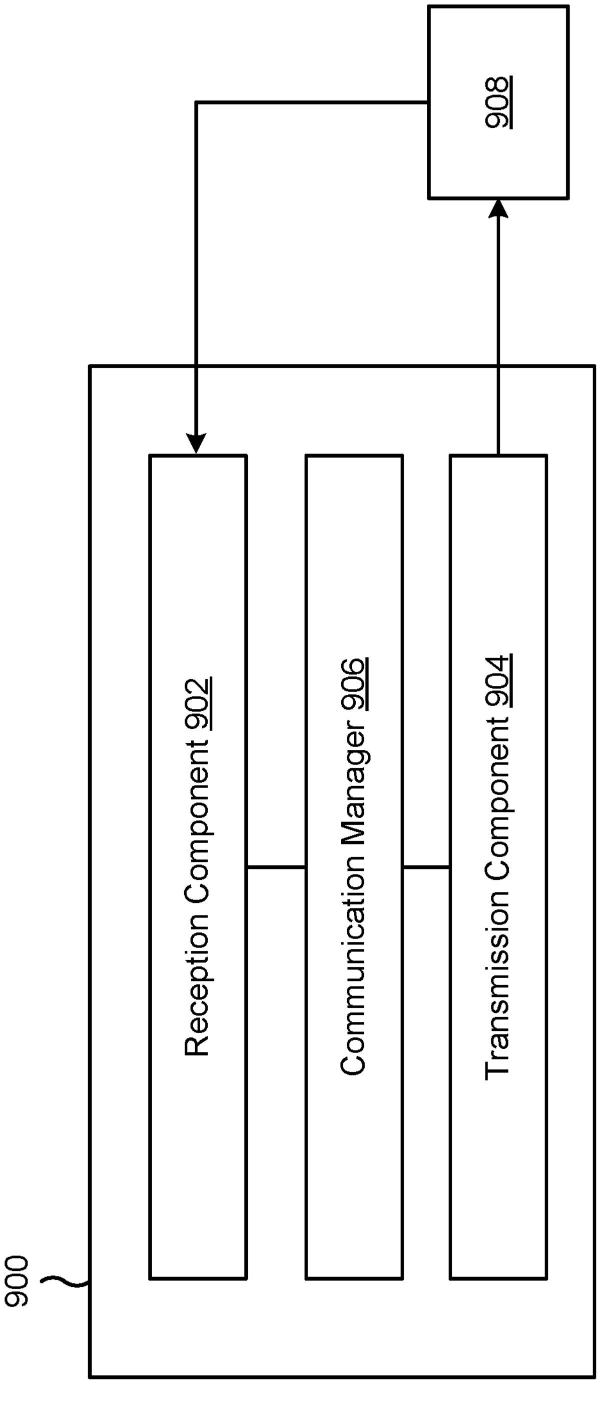
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 6A-6G. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The reception component 902 and/or the transmission component 904 may communicate on the set of BWPs of the set of scheduled cells based at least in part on the mapping of the value to the set of BWPs.

The reception component 902 may receive radio resource control signaling identifying a threshold for the quantity of BWPs configured for the at least one scheduled cell, wherein the condition is related to the quantity of BWPs configured for the at least one scheduled cell not exceeding the identified threshold. The reception component 902 may receive RRC signaling including a parameter associated with identifying a set of BWP identifiers for a group of cells, the group of cells including the set of scheduled cells, wherein each BWP identifier, of the set of BWP identifiers, maps to at least one possible value for the BWP indicator field, the mapping being based at least in part on the set of BWP identifiers for the group of cells. The reception component 902 may receive, during the switching gap, scheduling information for one or more of the scheduling cells, of the set of scheduled cells, for which a BWP switch is not indicated.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
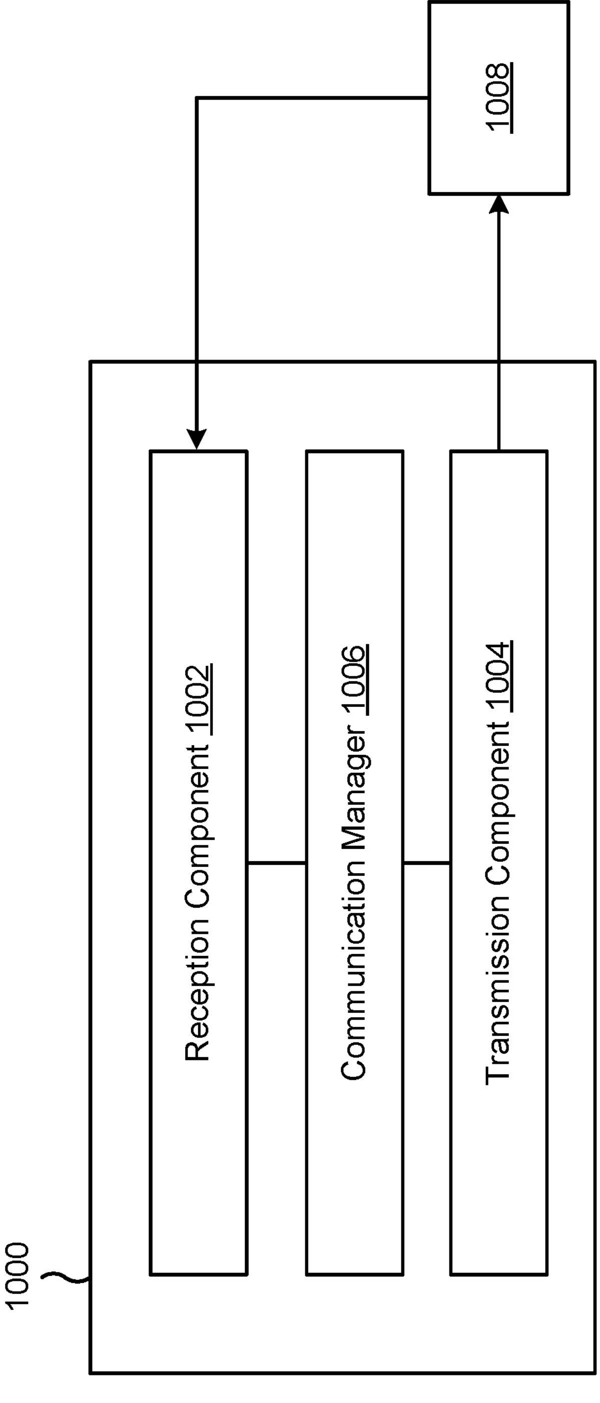
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6A-6G. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit DCI with a BWP indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell. The reception component 1002 and/or the transmission component 1004 may communicate on the set of BWPs of the set of scheduled cells based at least in part on the mapping of the value to the set of BWPs.

The transmission component 1004 may transmit radio resource control signaling identifying a threshold for the quantity of BWPs configured for the at least one scheduled cell, wherein the condition is related to the quantity of BWPs configured for the at least one scheduled cell not exceeding the identified threshold. The transmission component 1004 may transmit RRC signaling including a parameter associated with identifying a set of BWP identifiers for a group of cells, the group of cells including the set of scheduled cells, wherein each BWP identifier, of the set of BWP identifiers, maps to at least one possible value for the BWP indicator field, the mapping being based at least in part on the set of BWP identifiers for the group of cells. The transmission component 1004 may transmit, during the switching gap, scheduling information for one or more of the scheduling cells, of the set of scheduled cells, for which a BWP switch is not indicated.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving downlink control information (DCI) with a bandwidth part (BWP) indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell; and communicating on the set of BWPs of the set of scheduled cells based at least in part on the mapping of the value to the set of BWPs.

Aspect 2: The method of Aspect 1, wherein the mapping is based at least in part on all cells of the set of scheduled cells satisfying the condition.

Aspect 3: The method of any of Aspects 1-2, wherein the mapping is based at least in part on one or more cells of the set of scheduled cells satisfying the condition.

Aspect 4: The method of any of Aspects 1-3, further comprising: receiving radio resource control signaling identifying a threshold for the quantity of BWPs configured for the at least one scheduled cell, wherein the condition is related to the quantity of BWPs configured for the at least one scheduled cell not exceeding the identified threshold.

Aspect 5: The method of any of Aspects 1-4, wherein the mapping is based at least in part on a BWP indicator configuration specified in a specification table.

Aspect 6: The method of any of Aspects 1-5, wherein the mapping is based at least in part on an order of BWP identifier values for the set of BWPs.

Aspect 7: The method of any of Aspects 1-6, wherein the value maps to at least one null entry in a BWP table for a BWP, of the set of BWPs, the BWP being for a scheduled cell of the set of scheduled cells.

Aspect 8: The method of Aspect 7, wherein the DCI indicates no BWP switch for the BWP based at least in part on the value mapping to the at least one null entry.

Aspect 9: The method of Aspect 7, wherein the DCI indicates a BWP switch for the BWP based at least in part on the value mapping to the at least one null entry.

Aspect 10: The method of Aspect 7, wherein the value maps to another entry in the BWP table based at least in part on the value mapping to the at least one null entry.

Aspect 11: The method of any of Aspects 1-10, further comprising: receiving radio resource control (RRC) signaling including a parameter associated with identifying a set of BWP identifiers for a group of cells, the group of cells including the set of scheduled cells, wherein each BWP identifier, of the set of BWP identifiers, maps to at least one possible value for the BWP indicator field, the mapping being based at least in part on the set of BWP identifiers for the group of cells.

Aspect 12: The method of any of Aspects 1-11, wherein the UE is configured to forgo monitoring, during a switching gap between receiving the DCI and communicating on the set of BWPs of the set of scheduled cells, of a scheduling cell on which the DCI is received.

Aspect 13: The method of any of Aspects 1-12, wherein the UE is configured to monitor, during a switching gap between receiving the DCI and communicating on the set of BWPs of the set of scheduled cells, a scheduling cell on which the DCI is received based at least in part on the DCI not having an indicator of a change to a payload of a DCI format of the DCI.

Aspect 14: The method of Aspect 13, further comprising: receiving, during the switching gap, scheduling information for one or more of the scheduling cells, of the set of scheduled cells, for which a BWP switch is not indicated.

Aspect 15: A method of wireless communication performed by a network node, comprising: transmitting downlink control information (DCI) with a bandwidth part (BWP) indicator field with a value mapped to a set of BWPs for a set of scheduled cells, a mapping of the value to the set of BWPs being based at least in part on satisfaction, by at least one scheduled cell, of a condition relating to a quantity of BWPs configured for the at least one scheduled cell; and communicating on the set of BWPs of the set of scheduled cells based at least in part on the mapping of the value to the set of BWPs.

Aspect 16: The method of Aspect 15, wherein the mapping is based at least in part on all cells of the set of scheduled cells satisfying the condition.

Aspect 17: The method of any of Aspects 15-16, wherein the mapping is based at least in part on one or more cells of the set of scheduled cells satisfying the condition.

Aspect 18: The method of any of Aspects 15-17, further comprising: transmitting radio resource control signaling identifying a threshold for the quantity of BWPs configured for the at least one scheduled cell, wherein the condition is related to the quantity of BWPs configured for the at least one scheduled cell not exceeding the identified threshold.

Aspect 19: The method of any of Aspects 15-18, wherein the mapping is based at least in part on a BWP indicator configuration specified in a specification table.

Aspect 20: The method of any of Aspects 15-19, wherein the mapping is based at least in part on an order of BWP identifier values for the set of BWPs.

Aspect 21: The method of any of Aspects 15-20, wherein the value maps to at least one null entry in a BWP table for a BWP, of the set of BWPs, the BWP being for a scheduled cell of the set of scheduled cells.

Aspect 22: The method of Aspect 21, wherein the DCI indicates no BWP switch for the BWP based at least in part on the value mapping to the at least one null entry.

Aspect 23: The method of Aspect 21, wherein the DCI indicates a BWP switch for the BWP based at least in part on the value mapping to the at least one null entry.

Aspect 24: The method of Aspect 21, wherein the value maps to another entry in the BWP table based at least in part on the value mapping to the at least one null entry.

Aspect 25: The method of any of Aspects 15-24, further comprising: transmitting radio resource control (RRC) signaling including a parameter associated with identifying a set of BWP identifiers for a group of cells, the group of cells including the set of scheduled cells, wherein each BWP identifier, of the set of BWP identifiers, maps to at least one possible value for the BWP indicator field, the mapping being based at least in part on the set of BWP identifiers for the group of cells.

Aspect 26: The method of any of Aspects 15-25, wherein the network node is configured to forgo transmitting, during a switching gap between receiving the DCI and communicating on the set of BWPs of the set of scheduled cells, on a scheduling cell on which the DCI is received.

Aspect 27: The method of any of Aspects 15-26, wherein the network node is configured to transmit, during a switching gap between receiving the DCI and communicating on the set of BWPs of the set of scheduled cells, on a scheduling cell on which the DCI is transmitted based at least in part on the DCI not having an indicator of a change to a payload of a DCI format of the DCI.

Aspect 28: The method of Aspect 27, further comprising: transmitting, during the switching gap, scheduling information for one or more of the scheduling cells, of the set of scheduled cells, for which a BWP switch is not indicated.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more antennas; and one or more processors, coupled to one or more memories, configured to:

wirelessly receive downlink control information (DCI) with a bandwidth part (BWP) indicator field with a value mapped to a set of BWPs for a plurality of scheduled cells, a mapping of the value to the set of BWPs being based at least in part on an ascending order of BWP identifiers when each cell, of the plurality of scheduled cells, has a quantity of BWPs that satisfies a threshold; and wirelessly communicate on the set of BWPs based at least in part on the mapping of the value to the set of BWPs.

2. The UE of claim 1, wherein the one or more processors are further configured to:

receive radio resource control signaling identifying the threshold.

3. The UE of claim 1, wherein the mapping of the value to the set of BWPs is based at least in part on a BWP indicator configuration specified in a specification table when the quantity of BWPs does not satisfy the threshold for one or more cells of the plurality of scheduled cells.

4. The UE of claim 1, wherein the value is mapped to at least one null entry in a BWP table for a BWP, of the set of BWPs, the BWP being for a scheduled cell of the plurality of scheduled cells.

5. The UE of claim 4, wherein the DCI indicates no BWP switch for the BWP based at least in part on the value mapping to the at least one null entry.

6. The UE of claim 4, wherein the DCI indicates a BWP switch for the BWP based at least in part on the value mapping to the at least one null entry.

7. The UE of claim 4, wherein the value maps to another entry in the BWP table based at least in part on the value mapping to the at least one null entry.

8. The UE of claim 1, wherein the one or more processors are further configured to:

receive radio resource control (RRC) signaling including a parameter associated with identifying a set of BWP identifiers for a group of cells, the group of cells including the plurality of scheduled cells, wherein each BWP identifier, of the set of BWP identifiers, maps to at least one possible value for the BWP indicator field based at least in part on the set of BWP identifiers for the group of cells.

9. The UE of claim 1, wherein the one or more processors are configured to:

forgo monitoring, during a switching gap between receiving the DCI and communicating on the set of BWPs, of a scheduling cell on which the DCI is received.

10. The UE of claim 1, wherein the one or more processors are configured to:

monitor, during a switching gap between receiving the DCI and communicating on the set of BWPs, a scheduling cell on which the DCI is received based at least in part on the DCI not having an indicator of a change to a payload of a DCI format of the DCI.

11. The UE of claim 10, wherein the one or more processors are further configured to:

receive, during the switching gap, scheduling information for one or more of the scheduling cells, of the plurality of scheduled cells, for which a BWP switch is not indicated.

12. The UE of claim 1, wherein the quantity of BWPs satisfies the threshold when the quantity of BWPs is less than or equal to 3.

13. The UE of claim 1, wherein the one or more processors, to wirelessly communicate on the set of BWPs, are configured to:

wirelessly transmit a physical uplink shared channel (PUSCH) on the set of BWPs.

14. A network node for wireless communication, comprising:

one or more antennas; and one or more processors, coupled to one or more memories, configured to:

wirelessly transmit downlink control information (DCI) with a bandwidth part (BWP) indicator field with a value mapped to a set of BWPs for a plurality of scheduled cells, a mapping of the value to the set of BWPs being based at least in part on an ascending order of BWP identifiers when each cell, of the plurality of scheduled cells, has a quantity of BWPs that satisfies a threshold; and wirelessly communicate on the set of BWPs based at least in part on the mapping of the value to the set of BWPs.

15. The network node of claim 14, wherein the one or more processors are further configured to:

transmit radio resource control signaling identifying the threshold.

16. The network node of claim 14, wherein the mapping of the value to the set of BWPs is based at least in part on a BWP indicator configuration specified in a specification table when the quantity of BWPs does not satisfy the threshold for one or more cells of the plurality of scheduled cells.

17. The network node of claim 14, wherein the value maps to at least one null entry in a BWP table for a BWP, of the set of BWPs, the BWP being for a scheduled cell of the plurality of scheduled cells.

18. The network node of claim 17, wherein the DCI indicates no BWP switch for the BWP based at least in part on the value mapping to the at least one null entry.

19. The network node of claim 17, wherein the DCI indicates a BWP switch for the BWP based at least in part on the value mapping to the at least one null entry.

20. The network node of claim 17, wherein the value maps to another entry in the BWP table based at least in part on the value mapping to the at least one null entry.

21. The network node of claim 14, wherein the one or more processors are further configured to:

transmit radio resource control (RRC) signaling including a parameter associated with identifying a set of BWP identifiers for a group of cells, the group of cells including the plurality of scheduled cells, wherein each BWP identifier, of the set of BWP identifiers, maps to at least one possible value for the BWP indicator field based at least in part on the set of BWP identifiers for the group of cells.

22. The network node of claim 14, wherein the one or more processors are configured to:

forgo transmitting, during a switching gap between receiving the DCI and communicating on the set of BWPs, on a scheduling cell on which the DCI is transmitted.

23. The network node of claim 14, wherein the one or more processors are configured to:

transmit, during a switching gap between receiving the DCI and communicating on the set of BWPs, on a scheduling cell on which the DCI is transmitted based at least in part on the DCI not having an indicator of a change to a payload of a DCI format of the DCI.

24. The network node of claim 23, wherein the one or more processors are further configured to:

transmit, during the switching gap, scheduling information for one or more of the scheduling cells, of the plurality of scheduled cells, for which a BWP switch is not indicated.

25. The network node of claim 14, wherein the one or more processors, to wirelessly communicate on the set of BWPs, are configured to:

wirelessly receive a physical uplink shared channel (PUSCH) on the set of BWPs.

26. A method of wireless communication performed by a user equipment (UE), comprising:

wirelessly receiving downlink control information (DCI) with a bandwidth part (BWP) indicator field with a value mapped to a set of BWPs for a plurality of scheduled cells, a mapping of the value to the set of BWPs being based at least in part on an ascending order of BWP identifiers when each cell, of the plurality of scheduled cells, has a quantity of BWPs that satisfies a threshold; and wirelessly communicating on the set of BWPs based at least in part on the mapping of the value to the set of BWPs.

27. The method of claim 26, wherein the quantity of BWPs satisfies the threshold when the quantity of BWPs is less than or equal to 3.

28. The method of claim 26, wherein wirelessly communicating on the set of BWPs comprises:

wirelessly transmitting a physical uplink shared channel (PUSCH) on the set of BWPs.

29. A method of wireless communication performed by a network node, comprising:

wirelessly transmitting downlink control information (DCI) with a bandwidth part (BWP) indicator field with a value mapped to a set of BWPs for a plurality of scheduled cells, a mapping of the value to the set of BWPs being based at least in part on an ascending order of BWP identifiers when each cell, of the plurality of scheduled cells, has a quantity of BWPs that satisfies a threshold; and wirelessly communicating on the set of BWPs based at least in part on the mapping of the value to the set of BWPs.

30. The method of claim 29, wherein wirelessly communicating on the set of BWPs comprises:

wirelessly receiving a physical uplink shared channel (PUSCH) on the set of BWPs.

* * * * *